G. I. BAIR.
WINDOW FOR AUTOMOBILE CURTAINS.
APPLICATION FILED OCT. 6, 1919.
1,353,306.  Patented Sept. 21, 1920.
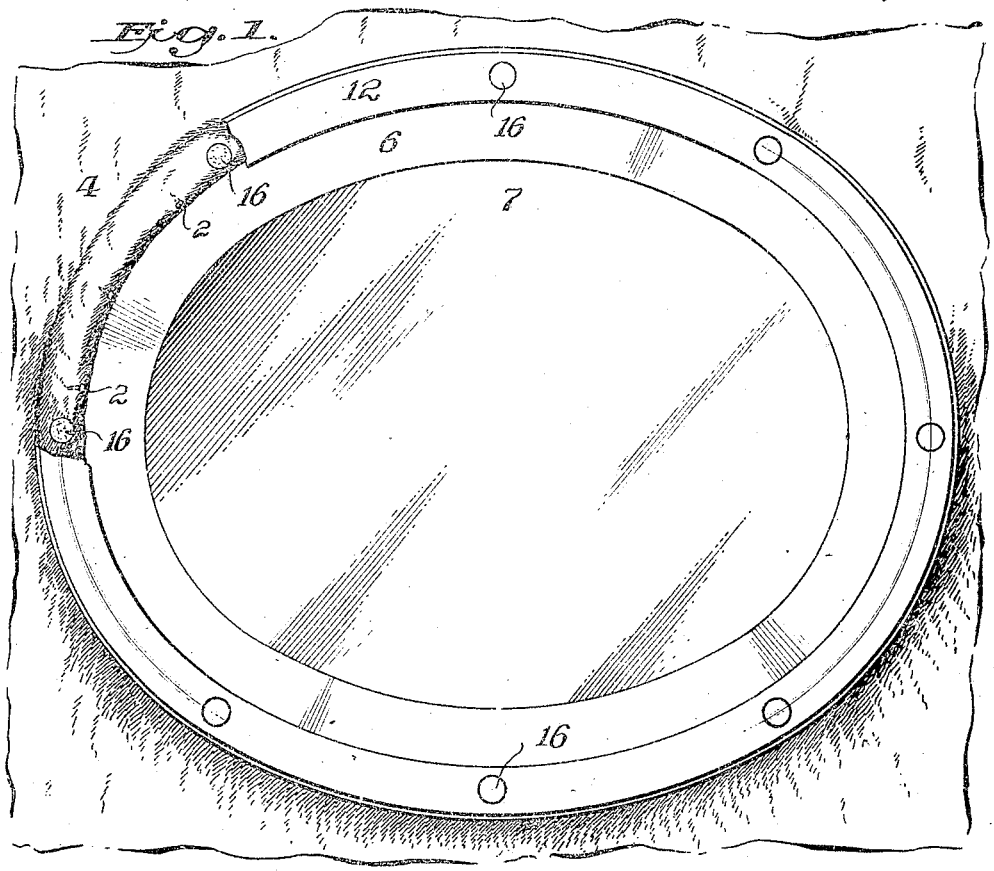
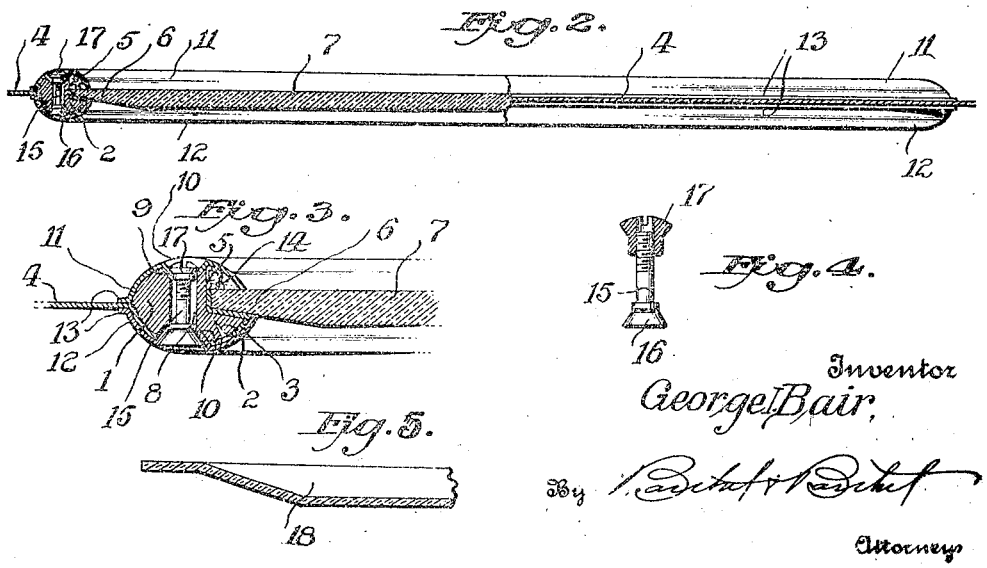

UNITED STATES PATENT OFFICE.

GEORGE I. BAIR, OF DETROIT, MICHIGAN.

WINDOW FOR AUTOMOBILE-CURTAINS.

1,353,306.

Specification of Letters Patent.  Patented Sept. 21, 1920.

Application filed October 6, 1919.  Serial No. 328,805.

*To all whom it may concern:*

Be it known that I, GEORGE I. BAIR, a citizen of the United States of America, residing at Detroit, in the county of Wayne and State of Michigan, have invented certain new and useful Improvements in Windows for Automobile-Curtains, of which the following is a specification, reference being had therein to the accompanying drawings.

This invention relates to windows for automobile curtains, panels, and top walls, and has special reference to a novel frame by which a rigid transparent plate may be connected and safely supported relative to a rigid or flexible support, as a top or body wall.

The object of my invention is to provide a frame to which a fabric may be easily and quickly connected and the marginal edges of the fabric inclosed by casings detachably connected to the frame and adapted for holding the marginal edges of a rigid transparent plate, for instance, a beveled pane of glass. Provision is made for cushioning and sealing the marginal edges of the transparent plate and the frame in its entirety is constructed to present a neat appearance, reduce the cost of manufacture, and facilitate the assembling of the various parts.

My invention will be hereinafter considered and then claimed, and reference will now be had to the drawing, wherein—

Figure 1 is a front elevation of the curtain window, partly broken away;

Fig. 2 is an edge view of the same partly broken away and partly in section;

Fig. 3 is an enlarged detail sectional view of a portion of a window frame, the section being taken through one of the frame connecting fasteners.

Fig. 4 is a detail view of a screw and nut or clamping device for the frame, and Fig. 5 is a sectional view of a portion of a modified form of transparent plate.

In the drawing, the reference numeral 1 denotes a frame made of a material which may be penetrated by tacks 2 and said frame may be oval or otherwise shaped, both in elevation and cross section.

Connected to the frame 1, by the tacks 2 which are suitably spaced throughout the frame, are the marginal edges 3 of a piece of fabric 4 such as used in collapsible automobile tops.

The frame 1 has its inner wall recessed throughout to form a seat 5 which is angular in cross section with one of its walls substantially in a plane with the body of the frame and its other wall transversely of the frame. The fabric 4 has its marginal edges carried onto the walls of the seat 5, as best shown in Fig. 3, to provide a cushion on the seat 5 for the beveled marginal edges 6 of a transparent plate 7, which may be what is commonly known in the glass art as "French plate."

The frame 1 at intervals throughout its circumference is provided with transverse openings 8 having the ends thereof flared, as at 9, and extending into the flared ends of said opening are the countersunk screw-sockets 10 of frames 11 and 12 engaging the inner and outer faces of the frame 1, said frames providing casings which conform in cross section to the frame 1 so that said casings may inclose the frame 1 and engage the fabric 4 and the plate 7. The casings 11 and 12 have lateral flanges 13 engaging the fabric 4 and the other edges of said casings engage the beveled edge of the plate 7 with the casing 11 retaining the plate on its cushioned seat. A cement or any suitable material, indicated at 14, may be placed in the casing 11 to fill the space between said casing, the seat 5 and the plate 7 so that said plate cannot rattle, will avoid leakage, and will be positively anchored in its frame.

Extending through the openings 8 and connecting the frames 11 and 12 are screw bolts 15 having heads 16 and nuts 17, the bolt head 16 engaging in the sockets 10 of the casing 12 and the nuts 17 engaging in the sockets 10 of the casing 11, so that the heads and nuts of the screw bolts will be countersunk or at least flush with the outer walls of the casings 11 and 12.

In practice, the fabric, 4 is cut and punched to provide the large opening which is to be closed by the plate 7 and also to provide the openings through which the screw sockets 10 of the casing 12 extend, and with the fabric tacked or otherwise connected to the frame 1, the plates 7 may be quickly placed in position and the frames 11 and 12 connected by the screw-bolt.

When this type of rigid plate window forms part of an automobile top, provision may be made for holding the window portion of the top while the top is folded or being manipulated, so that the plate glass will not be broken or cause portions of the top to unduly sag and sway during the movement of an automobile.

In Fig. 5 there is illustrated a transparent plate 18 and this plate may be pressed from sheet glass and if necessary polished so that it will have the same finish and light transmitting qualities as the beveled plate glass. It is obvious that this pressed glass will be of less weight and cheaper to manufacture and renew should occasion so require.

It is obvious that the frame inclosing casings can be readily finished to harmonize with metallic fixtures or trimmings of an automobile, and that my invention is susceptible to such changes as fall within the scope of the appended claim.

What I claim is:—

An automobile window comprising a frame having transverse openings and a seat for a transparent plate, fabric attached to said frame, casings inclosing said frame, said casings being provided with sockets extending into the frame openings, and screws and nuts in the sockets of said casings and the openings of said frame to retain said casings on said frame.

In testimony whereof I affix my signature in the presence of two witnesses.

GEORGE I. BAIR.

Witnesses:
ANNA M. DORR,
KARL H. BUTLER.